(12) United States Patent
Davis et al.

(10) Patent No.: US 12,200,060 B2
(45) Date of Patent: Jan. 14, 2025

(54) SYSTEM AND METHOD FOR PROCESSING BANK TRANSACTIONS

(71) Applicant: Diebold Nixdorf, Incorporated, Hudson, OH (US)

(72) Inventors: Steven Davis, North Lawrence, OH (US); Luke Huba, Akron, OH (US); Lori Harbaugh, Massillon, OH (US); Nicole Fleming, New Franklin, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 75 days.

(21) Appl. No.: 18/137,783

(22) Filed: Apr. 21, 2023

(65) Prior Publication Data

US 2023/0344905 A1    Oct. 26, 2023

Related U.S. Application Data

(60) Provisional application No. 63/333,288, filed on Apr. 21, 2022.

(51) Int. Cl.
| | |
|---|---|
| *H04L 67/12* | (2022.01) |
| *G06V 20/52* | (2022.01) |
| *G07F 19/00* | (2006.01) |
| *G08B 3/10* | (2006.01) |
| *G08B 5/22* | (2006.01) |
| *G08B 21/22* | (2006.01) |

(52) U.S. Cl.
CPC .............. *H04L 67/12* (2013.01); *G06V 20/52* (2022.01); *G07F 19/00* (2013.01); *G08B 3/1016* (2013.01); *G08B 5/223* (2013.01); *G08B 21/22* (2013.01)

(58) Field of Classification Search
CPC ......... H04L 67/12; G06V 20/52; G07F 19/00; G08B 21/22
See application file for complete search history.

(56) References Cited

U.S. PATENT DOCUMENTS

| | | | |
|---|---|---|---|
| 8,401,230 B2* | 3/2013 | Kozitsky .............. | G06Q 10/087 382/104 |
| 8,800,866 B1* | 8/2014 | Gromley .............. | G07F 19/202 235/375 |
| 9,098,961 B1* | 8/2015 | Block ................... | G07F 19/201 |
| 10,043,202 B2* | 8/2018 | Gilbertson ............ | G06Q 20/18 |
| 10,360,541 B2* | 7/2019 | Gromley ................ | G07F 9/026 |
| 10,860,995 B2* | 12/2020 | Kelly .................... | G06Q 20/327 |
| 10,885,513 B2* | 1/2021 | Van Wiemeersch ......................... G06Q 20/3278 |
| 11,605,110 B2* | 3/2023 | Narasimhan ....... | G06Q 30/0261 |
| 11,636,458 B1* | 4/2023 | Radhakrishnen .. | G06Q 20/3223 705/75 |
| 2014/0267793 A1* | 9/2014 | Wang ................... | G06V 10/255 348/207.1 |

\* cited by examiner

*Primary Examiner* — John A Tweel, Jr.
(74) *Attorney, Agent, or Firm* — Black McCuskey (57) ABSTRACT

A system for processing bank transactions and a method for operating the system are disclosed. The system can include a plurality of article exchanging units. Each of said plurality of article exchanging units can be configured to receive items from a bank customer and present items to the bank customer. The system can also include a communications controller configured to communicate according to the internet protocol with said plurality of article exchanging units.

20 Claims, 3 Drawing Sheets

SYSTEM AND METHOD FOR PROCESSING BANK TRANSACTIONS

CROSS-REFERENCE TO RELATED APPLICATIONS

This application claims the benefit of U.S. Provisional Patent Application Ser. No. 63/333,288 for a MULTI-LANE COMMUNICATIONS SYSTEM, filed on Apr. 21, 2022, which is hereby incorporated by reference in its entirety.

BACKGROUND

1. Field

This disclosure relates in general to methods and systems for completing transactions initiated in a drive-through lane.

2. Description of Related Prior Art

A drive-through lane allows an individual to conduct a transaction while seated in a vehicle. The transaction begins when a first individual communicates the details of the desired transaction to a second individual. The details can be communicated face-to-face, or through a system including at least one microphone and at least one speaker. Vehicles can form a line and move in one direction through the drive-through.

U.S. Pub. No. 2018/0122022 discloses DRIVE-THRU/POINT-OF-SALE AUTOMATED TRANSACTION TECHNOLOGIES AND APPARATUS, which include methods and apparatus for the automated provision of goods through the use of scanning systems. More specifically, the '022 publication provides a method for automatically conveying which goods are being ordered, where the goods will be picked up, an associated method of payment, kitchen fulfillment, item tracking, and automatic delivery by a dispenser apparatus. In preferred embodiments, the present invention is applied to the automated ordering and pick-up of food items at a fast-food restaurant.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system for processing bank transactions and a method for operating the system are disclosed. The system can include a plurality of article exchanging units. Each of said plurality of article exchanging units can be configured to receive items from a bank customer and present items to the bank customer. The system can also include a communications controller configured to communicate according to the internet protocol with said plurality of article exchanging units.

According to other features, each of the plurality of article exchanging units can have one or more processors. Each of the plurality of article exchanging units can be positioned in one of a plurality of drive-through lanes. The plurality of article exchanging units can include at least a first article exchanging unit differently configured from at least a second article exchanging unit. Each of the plurality of article exchanging units can include at least one of a camera and a microphone configured to generate at least one of visual data and audio data. The plurality of article exchanging units can include a pneumatic vacuum module, an automated transaction machine ("ATM"), and a transaction drawer. The pneumatic vacuum module can include a display screen.

In other features, the system can also include at least one operator computing device. The at least one operator computing device can have one or more processors and a display screen. The at least one operator computing device can be a tablet computer. The mobile operator computing device can include a speaker to emit audio data, such as audio data generated at one of the plurality of article exchanging units. The mobile operator computing device can emit video data through the display, such as video data generated at one of the plurality of article exchanging units.

According to additional features, the system can be practiced at a bank branch including a plurality of drive-through lanes. A customer in a vehicle can be received in one of the plurality of drive-through lanes at the bank branch. The plurality of drive-through lanes can be positioned adjacent to a bank branch and be arranged at least partially side-by-side. The at least one operator computing device can be further defined as remote from the bank branch.

According to other features, the system can also include a plurality of proximity sensors. One of the plurality of proximity sensors can be positioned in each of the plurality of drive-through lanes. Each of the plurality of proximity sensors can be configured to detect a vehicle within the respective drive-through lane and emit a detection signal in response to detecting the vehicle. The communications controller can receive the detection signal when emitted by any of the plurality of proximity sensors.

In other features, the system can also include a plurality of internet protocol interfaces. One of the plurality of internet protocol interfaces can be engaged with each of the plurality of article exchanging units. Each of the plurality of internet protocol interfaces can be configured to facilitate internet protocol communication between the plurality of article exchanging units and at least the communications controller.

According to additional features, in a method of operating a system for processing bank transactions, the communications controller can transmit an alert signal to the at least one operator computing device in response to receiving the detection signal from one of the sensors, wherein the alert signal indicates the presence of the vehicle and indicates a particular lane of the plurality of drive-through lanes in which the vehicle is detected. The display screen of the mobile operator computing device can display a first field containing a plurality of rows wherein each row of the plurality of rows can correspond to each lane of the plurality of drive-through lanes at the bank branch. A plurality of buttons can also be displayed in the plurality of rows. Upon receiving the alert signal and in response thereto, the mobile operator computing device can alter one of the buttons that is displayed on the display screen in the row that corresponds to the respective drive-through lane from a first configuration to a second configuration. When the transmission of the detection signal ceases, the transmission of the alert signal can cease and, in response thereto, the mobile operator computing device can return the configuration of the button to the first configuration. In a method of operating a system for processing bank transactions, the at least one operator computing device can also display buttons that allow a teller to open and close audio and video communication with the customer in the vehicle.

BRIEF DESCRIPTION OF THE DRAWINGS

The detailed description set forth below references the following drawings.

DETAILED DESCRIPTION

The present disclosure, as demonstrated by the exemplary embodiment described below, can provide a communications system for use in a multi-lane, outdoor drive-up transaction processing environment. By way of example and not limitation, bank branches and pharmacies are two such operating environments. The communications system described herein will be easy to use, easy to install, and easy to upgrade.

Figure 1:
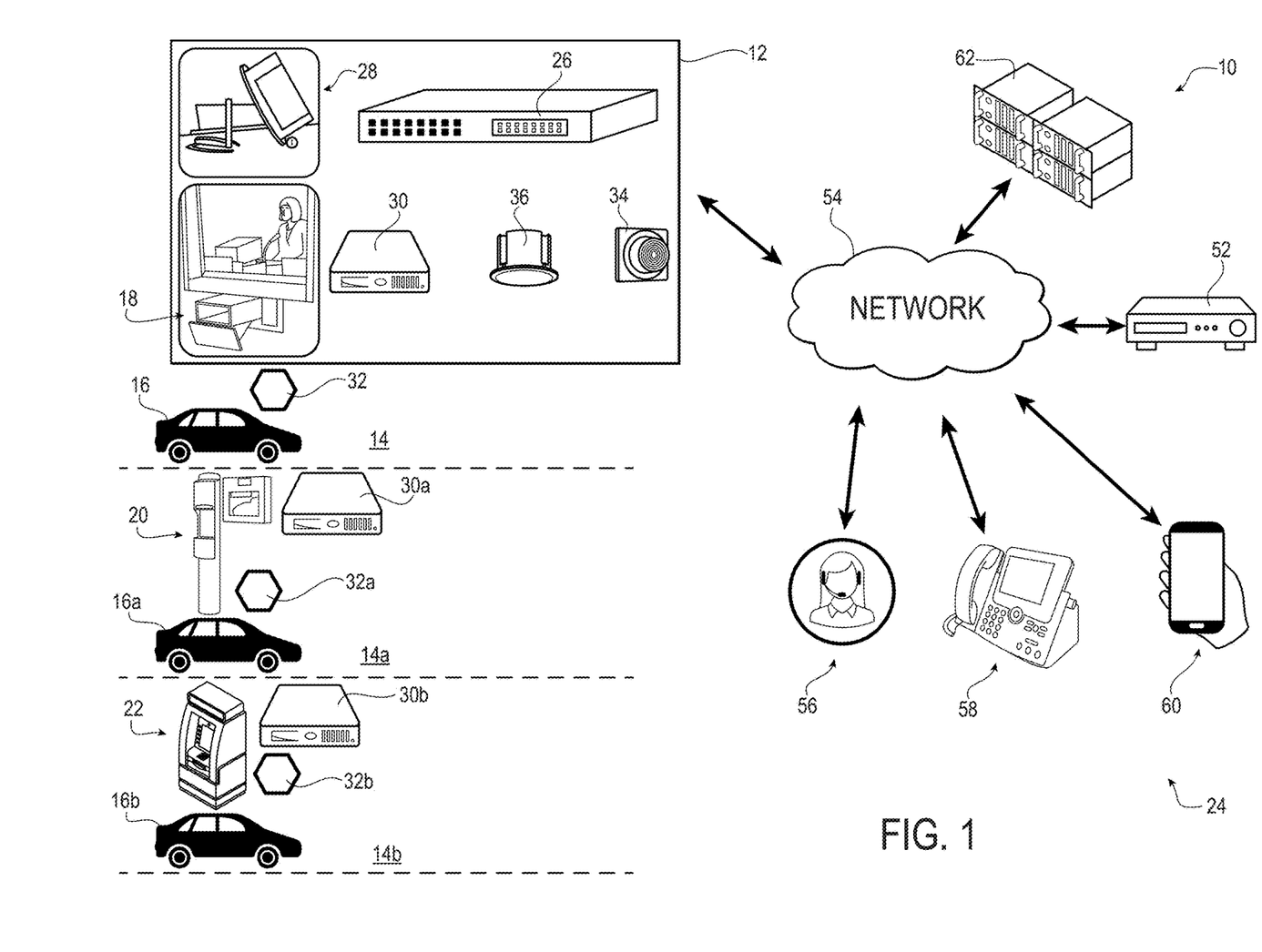
FIG. 1 is a schematic of an operating environment incorporating an exemplary embodiment of the present disclosure.

Referring now to FIG. 1, an exemplary operating environment 10 includes a bank branch 12. A plurality of drive-through lanes 14, 14a, 14b are arranged along the exterior of the bank branch 12. Vehicles, such as vehicles 16, 16a, 16b, can move into any one of the drive-through lanes 14, 14a, 14b. Persons seeking service from the bank branch 12 can be driving the vehicles 16, 16a, 16b. Thus, customers in vehicles can be received in one of drive-through lanes of a plurality of drive-through lanes 14, 14a, 14b at a bank branch 12.

Service can be provided in the exemplary drive-through lanes 14, 14a, 14b through article exchange units positioned in each of the drive-through lanes 14, 14a, 14b, such as one in the form of a transaction drawer 18 that can receive an article from a customer in the drive through lane such as documents, currency, check(s), a deposit or withdrawal slip, and/or an identification card. The drive-through lane can be located at a branch of a bank. A "branch" of a bank can include a building into which customers can enter to conduct financial transactions. An "article exchange unit" can be configured to receive items from a bank customer and present items for the bank customer retrieval. In other embodiments, an article can take a different form. Service can be provided in the exemplary drive-through lane 14a through an article exchange unit in the form of a pneumatic/vacuum (or "VAT") module 20 that can receive an article from a customer such as documents or a card. Service can be provided in the exemplary drive-through lane 14b through an article exchange unit in the form of a terminal 22 that can receive an article from a customer such as documents or a card. In one or more embodiments, the system 24 can include a controller of the VAT module 20. Such a controller could not only control the audio and video transmitted via the VAT module 20, but it could also control the operation of the VAT module 20 such as controlling when to turn the blowers based on inputs received from the switch presses/activations of the VAT module 20. Completion of the transaction can include the dispensing of an article to the customer through the exemplary transaction drawer 18 or through the exemplary pneumatic/vacuum module 20. For example, in an embodiment of the present disclosure operating at a pharmacy, pharmaceuticals can be dispensed to the customer at the end of the transaction and/or a clipboard and pen can be dispensed to the customer during the transaction.

The exemplary terminal 22 can be similar to an automated transaction machine but controlled by a teller in the bank branch 12. It is noted that a "teller" is an operator in the exemplary embodiment of the present disclosure, but other forms of operator would function in other embodiments of the present disclosure. For example, in an embodiment of the present disclosure operating at a pharmacy, a pharmacist could be an operator. Thus, tellers and pharmacists are exemplary operators of various embodiments of the present disclosure.

Figure 3:
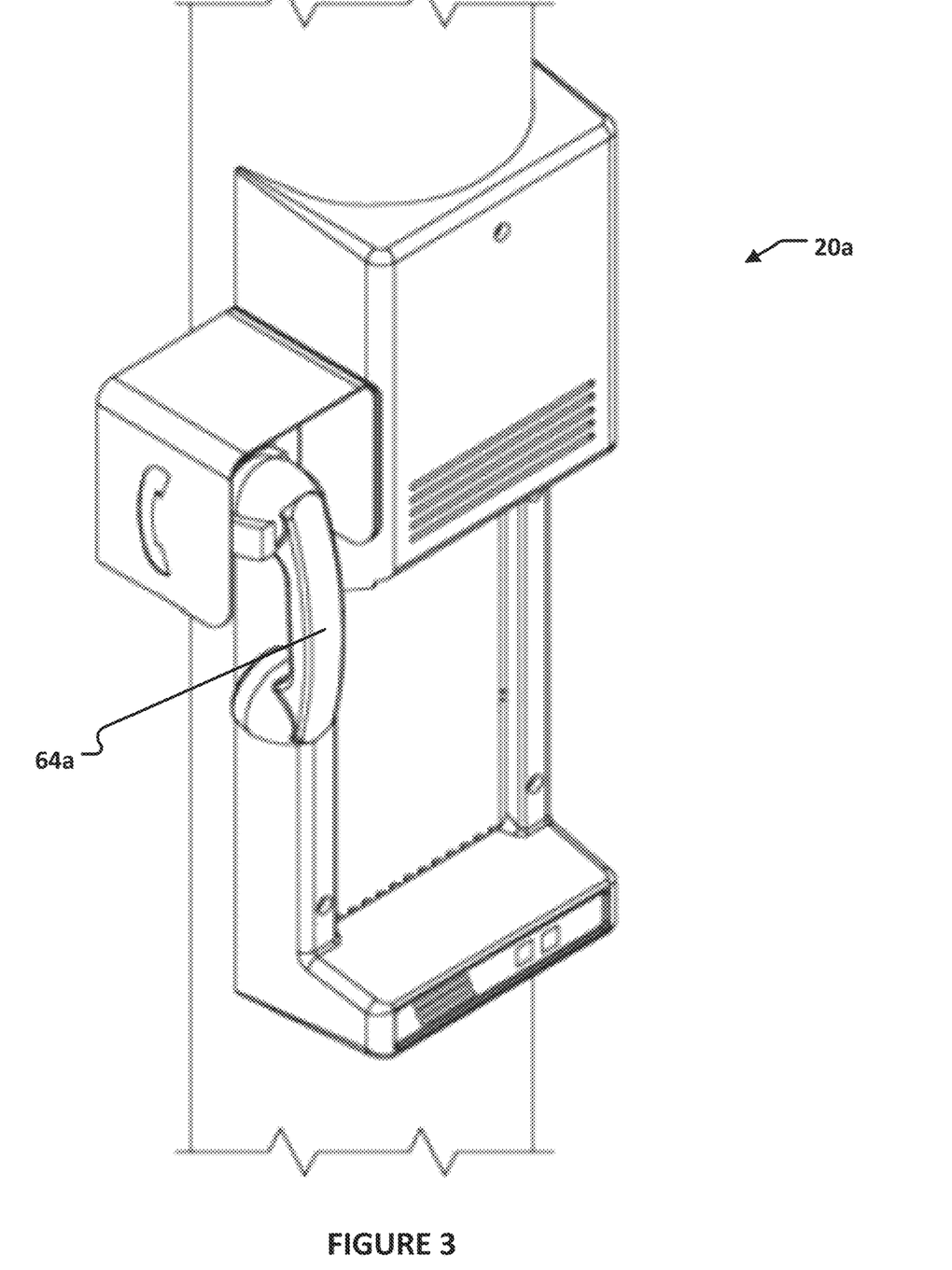
FIG. 3 is a perspective view of an embodiment of a pneumatic/vacuum module having a handset that can be a component of one or more embodiments of the present disclosure.

The location of any circuit boards/modules in any of the transaction drawer 18, the pneumatic/vacuum module 20, or the terminal 22 can be minimized to mitigate weather related issues. Any microphone and/or speaker on the transaction drawer 18, the pneumatic/vacuum module 20, or the terminal 22 can be configured to function acceptably even when wind or rain directly hit the unit. The exemplary multi-lane communication system 24 can also include a handset at any one or all of the transaction drawer 18, the pneumatic/vacuum module 20, or the terminal 22 and be configured to mute any other speaker and microphone. FIG. 3 is a perspective view of a handset 64a positioned at an alternative embodiment of a pneumatic/vacuum module 20a that can be desirable for an embodiment of the present disclosure operating at a pharmacy.

An exemplary multi-lane communication system 24 is implemented in the exemplary operating environment 10. The transaction drawer 18, the pneumatic/vacuum module 20, and the terminal 22 are viewed as components of the exemplary multi-lane communication system 24 in this disclosure. It is noted that a transaction drawer, a pneumatic/vacuum module, and/or a terminal need not be viewed as components of other embodiments of a multi-lane communication system. In the exemplary embodiment of the present disclosure, the exemplary transaction drawer 18, the exemplary pneumatic/vacuum module 20, and the exemplary terminal 22 each include an integrated call button, microphone, speaker, camera, and/or display.

The exemplary multi-lane communication system 24 also includes a communications controller 26. The exemplary communications controller 26 defines a server or hub of the exemplary multi-lane communication system 24 for processing and connectivity. The exemplary communications controller 26 can be powered by an electrical power source providing 90-264 VAC, 50/60 Hz. The exemplary communications controller 26 can be mountable to a wall or may be located in a knee space panel of teller/operator workstation. The exemplary communications controller 26 can be firmware/software-driven allowing for simple on-site or remote field firmware upgrades and remote health checks.

The exemplary multi-lane communication system 24 also includes an operator computing device 28. The exemplary operator computing device 28 is a tablet computer. An operator computing device could take other forms in other embodiments of a multi-lane communication system, such as a desktop computer. The exemplary communications controller 26 and the exemplary operator computing device 28 are in data communication with one another and can cooperatively operate together to complete transactions and manage the flow of customers through the drive-in lanes 14, 14a, 14b. It is noted that while only one operator computing device is presented, the exemplary communications controller 26 can communicate and operate cooperatively with a plurality of operator computing devices. The exemplary communications controller 26 and the exemplary operator computing device 28 can communicate with one another utilizing a secured, wireless communication protocol. The exemplary communications controller 26 can be configured to automatically detect the presence of the exemplary operator computing device 28. In one or more embodiments, the exemplary communications controller 26 could allow the teller to exercise control the VAT module 20 with the exemplary operator computing device 28, such as when the teller is assisting a customer.

The operator computing device 28 can have a relatively small footprint. The operator computing device 28 can have an integrated microphone, speaker, camera, and/or display. The exemplary operator computing device 28 is physically stable and robust and can be received in a wall or counter mount. The operator computing device 28 can also include a wired or wireless headset and a privacy handset.

The exemplary multi-lane communication system 24 also includes interfaces to facilitate data communication between the exemplary communications controller 26 and, respectively, the transaction drawer 18, the pneumatic/vacuum module 20, and the terminal 22. Such interfaces facilitate data communication according to internet protocol (IP) and are referenced by numbers 30, 30*a*, 30*b*. The IP interfaces can be defined by hardware, software, or a combination of hardware and software. The IP interfaces 30, 30*a*, 30*b* are configured to seek and obtain an IP address. The IP interfaces 30, 30*a*, 30*b* are configured to report their respective IP addresses to other components in the system 24, including the communications controller 26. The IP interfaces 30, 30*a*, 30*b* are configured to package data generated by the article exchange units 18, 20, 22 into IP packets and transmit those packets to the communications controller 26. The IP interfaces 30, 30*a*, 30*b* are configured to receive IP packets from the communications controller 26 and convert the data in those IP packets, as may be necessary, to a format applied by the respective article exchange units 18, 20, 22.

In the exemplary embodiment, data communication between the exemplary communications controller 26 and, respectively, the transaction drawer 18, the pneumatic/vacuum module 20, and the terminal 22, allows each of the transaction drawer 18, the pneumatic/vacuum module 20, and the terminal 22 to communicate with the exemplary operator computing device 28. Thus, in the exemplary embodiment, the exemplary operator computing device 28 is in data communication with the transaction drawer 18, the pneumatic/vacuum module 20, and the terminal 22 through the exemplary communications controller 26. The exemplary communications controller 26 can receive signals indicating that a carrier has arrived in the bank branch 12 from the pneumatic/vacuum module 20 or when a document arrives in the bank branch 12 from the transaction drawer 18 and communicate that data to the exemplary operator computing device 28. The exemplary communications controller 26 can communicate wirelessly with the transaction drawer 18, the pneumatic/vacuum module 20, and the terminal 22 or via wire, but is it noted that a maximum cable distance between the exemplary communications controller 26 to any one of the transaction drawer 18, the pneumatic/vacuum module 20, and the terminal 22 may be three hundred and twenty feet when using CAT6 cabling; beyond that distance, extenders could be added which would allow the distance to go over six thousand feet. Wireless communication would be secured. In one or more embodiments, fiber optic communications could be applied between the operator and/or customer units and the controller. In such embodiments, a power cable and a fiber optic cable would be run between the end points and the controller. Video signals, audio signals, control signals, and data signals upon which control logic is applied could be transmitted over the fiber optic cables.

The exemplary multi-lane communication system 24 can be configured to operate voice and video over IP (V2oIP) for communications between (a) a person (hereafter a "customer") seeking service from the bank branch 12 through one of the exemplary transaction drawer 18, the exemplary pneumatic/vacuum module 20, and the exemplary terminal 22 and (b) an operator such as a teller operating the exemplary operator computing device 28 to provide service to the customer. For pharmacy applications that require interfacing to IP or analog phone systems, the exemplary transaction drawer 18 and/or the exemplary pneumatic/vacuum module 20 can utilize a phone system infrastructure for communication and control.

Alternatively, embodiments of the multi-lane communication system can be voice only. Alternatively, embodiments of the multi-lane communication system can provide video of the customer to the operator without video of the operator to the customer (one-way video) with voice to both parties. Alternatively, embodiments of the multi-lane communication system can provide video and voice of the customer and the operator to one another (two-way video and voice). The exemplary multi-lane communication system 24 can be a platform scalable from a one operator to one customer (1×1), to eight operators each operating an operator computing device and servicing customers in sixteen drive-through lanes (8×16), and further to unlimited operators and customers, all sizes using simultaneous two-way conversation (full duplex). The exemplary multi-lane communication system 24 can also permit more than one operator to be in audio communication with a single consumer at the same time.

In an exemplary scenario of operation, a customer can drive up to one of the one of the exemplary transaction drawer 18, the exemplary pneumatic/vacuum module 20, and the exemplary terminal 22 and press a call button. Alternatively, the multi-lane communication system can include detection components to automatically alert an operator of the customer's arrival for service. For example, the exemplary multi-lane communication system 24 can include sensors, such as proximity sensors referenced by 32, 32*a*, 32*b*. Each sensor 32, 32*a*, 32*b* can emit a signal to the exemplary communications controller 26 in response to the arrival of a customer at the relevant drive-through lane 14, 14*a*, 14*b*. The exemplary communications controller 26 can then alert the exemplary operator computing device 28 of the customer's arrival.

In one or more embodiments, the exemplary multi-lane communication system 24 can present information such as advertising to the customer as the customer waits for an operator. The advertising can be video advertising and/or audio advertising. Advertising can also be presented when the customer waits as the operator processes the requested transaction. In addition to advertising or instead of advertising, the exemplary communications controller 26 can control a speaker at the relevant one of the transaction drawer 18, the pneumatic/vacuum module 20, or the terminal 22 to emit an automated, pre-recorded message greeting the customer.

In one or more embodiments, the exemplary multi-lane communication system 24 can allow the customer to identify himself/herself and select a transaction type before the operator is called through the exemplary operator computing device 28. The customer can be identified by inserting a card into a card reader device and/or by a biometric sensor positioned at the relevant one of the transaction drawer 18, the pneumatic/vacuum module 20, or the terminal 22. The exemplary communications controller 26 can receive visual or audio data from a camera or microphone at the relevant one of the transaction drawer 18, the pneumatic/vacuum module 20, or the terminal 22 and apply video or audio analytic software to the received data in order to identify the customer. The data may include a facial image of the customer or a license plate capture or a capture of the customer's voice. Audio data generated by a microphone at any one or all of the transaction drawer 18, the pneumatic/vacuum module 20, or the terminal 22, can be filtered/processed to reduce and/or eliminate ambient noise, including wind, found in the drive-up environment.

In one or more embodiments, the exemplary multi-lane communication system 24 can include alerting components such as a light 34 or a speaker 36 positioned in the bank branch 12. The exemplary communications controller 26 can receive a signal from one of the sensors 32, 32a, 32b indicative of the presence of a vehicle at one of the transaction drawer 18, the pneumatic/vacuum module 20, or the terminal 22. In response, the exemplary communications controller 26 can control and activate the exemplary light 34 and/or control the speaker 36 to emit sound. Alternatively, the exemplary communications controller 26 can control and active the exemplary light 34 and/or control the speaker 36 to emit sound in response to receiving a signal from a call button located at one of the transaction drawer 18, the pneumatic/vacuum module 20, or the terminal 22. The emission of light from the light 34 and/or sound from the speaker 36 can prompt the operator to respond to the customer.

Figure 2:
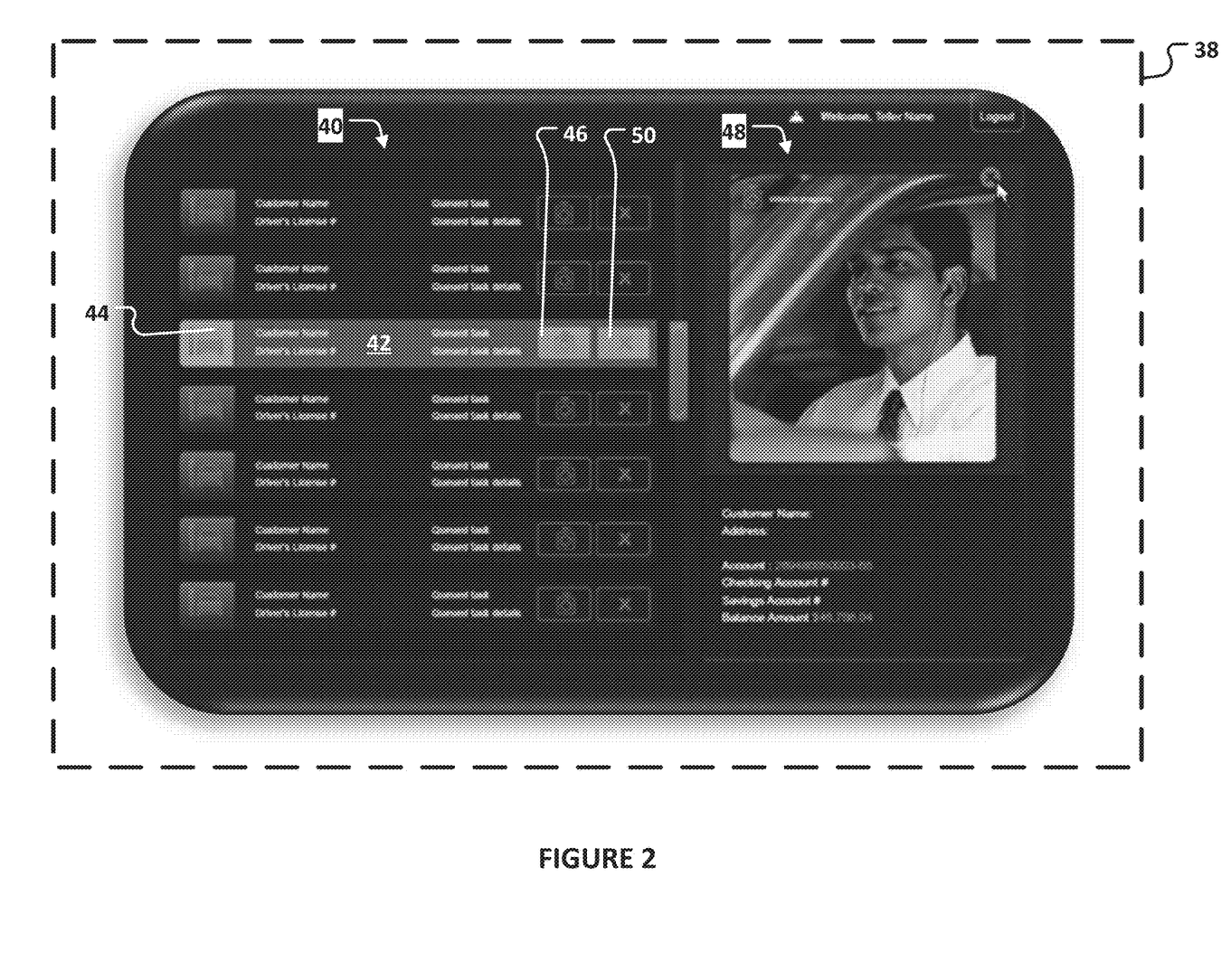
FIG. 2 is an exemplary screen display generated by the exemplary embodiment of the present disclosure.

The exemplary multi-lane communication system 24 can enhance the operator's control over the flow of customers in the drive-through lanes 14, 14a, 14b through a customer queuing protocol. FIG. 2 is an exemplary screen display generated by the exemplary communications controller 26 on a display 38 of the exemplary operator computing device 28. An exemplary first field 40 presented on the display 38 includes rows, such as row 42, that each correspond to a drive-through lane. Each row includes a presence thumbnail indicia, such as presence thumbnail indicia 44, that can indicate, through the use of alternative color patterns, the presence of a vehicle in the respective drive-through lane. For example, the presence thumbnail indicia 44 includes a bright blue vehicle against a light gray background, which indicates a vehicle is present in the drive-through lane associated with row 42. The presence thumbnail indicia of the other rows include a light gray vehicle against a dark gray background, which indicates a vehicle is not present in the drive-through lane associated with those rows.

FIG. 2 also discloses that each row can include other indicia to provide the operator with more information to assist in completing the transaction. For example, textual indicia is displayed including the customer's name, drivers license number, the queued or type of transaction being requested, and details of the requested transaction. A camera thumbnail indicia, such as camera thumbnail indicia 46, is included which can be selected by the operator to display a video feed from a camera at the at the relevant one of the transaction drawer 18, the pneumatic/vacuum module 20, or the terminal 22. It is noted that, while not shown in FIG. 2, a microphone thumbnail indicia can be displayed in each row 42 and can be selected by the operator to transmit audio data to the customer in the drive-through lane or to mute audio data. The video feed is displayed on an exemplary second field 48 presented on the display 38, along with further textual indicia of details of the customer and/or the transaction that has been requested. A completion indicia, such as completion indicia 50, is included which can be selected by the operator to end interaction with a current customer in order to move on to another customer.

The customer queuing protocol presented on the visual display 38 facilitates the consecutive greeting and servicing of drive-up customers to enhance customer service and expedite the flow of traffic. The sequential order in which customers press call buttons and the subsequent order that a carrier arrives in an operating environment such as the bank branch 12 or a pharmacy from the pneumatic/vacuum module 20 or a document arrives in the bank branch 12 from the transaction drawer 18 can be tracked by the exemplary communications controller 26 and displayed on the display 38. The display 38 provides operators with a mechanism to distinguish the order of customer arrivals and to promptly provide service according to that order. For example, the rows displayed in the field 40 can be arranged so that the "first" customer is displayed in the vertically top row.

In one or more embodiments, during the completion of the transaction, the operator can control the camera located at the relevant one of the transaction drawer 18, the pneumatic/vacuum module 20, or the terminal 22 to better view the customer. Two scan camera ports can be in data communication with the exemplary operator computing device 28, which when connected to a camera at one of the transaction drawer 18, the pneumatic/vacuum module 20, and the terminal 22 and another camera directed at a lobby of the bank branch 12 allow the operator to view the drive-up area of customer lanes and also the lobby when no specific lane (customer point) is selected by the operator.

Referring again to FIG. 1, the exemplary multi-lane communication system 24 also includes components that are physically remote from the bank branch 12. The exemplary multi-lane communication system 24 includes a database or data store 52. The exemplary communications controller 26 is in data communication with the database 52 over a network 54. The network 54 can include a local area network (LAN), a wide area network (WAN), e.g., the Internet, or any combination thereof. The present disclosure is well suited to a wide variety of computer network systems over numerous topologies.

All data streams and communications within the exemplary multi-lane communication system 24 can be recorded and stored in the database 52. For example, video and audio feeds from customers and operators can be recorded and stored in the database 52. Further, the exemplary communications controller 26 can record events and time periods between events and store this data in the database 52. Events can include vehicle/customer arrival, greeting of the customer, initiation of a transaction, completion of transaction, and vehicle/customer departure. Events can be correlated to other data such as a particular transaction, the relevant drive-through lane, the date, the time, and the responsible operator. This data can be utilized for analytics to tabulate total vehicles/customers serviced, predict customer activity, and monitor operator productivity. Events can also include the activation/usage of components so that component lifespan can be monitored and maintenance schedules can be docketed. Monitoring the activation/usage of components can be facilitated by appropriate sensors, each appropriately positioned. Monitoring the activation/usage of components can also be facilitated by logging command calls. For example, when a command is initiated at the exemplary operator computing device 28 for the transaction drawer 18 to open, the initiation of the command can be logged or counted as one operation of the components associated with opening the transaction drawer 18, such as a motor, bearings, seals, etc. Time periods stored can include the response time between a customer's arrival and a greeting from an operator as well as a service time between a customer's arrival and the customer's departure.

It is noted that, in one or more embodiments of the present disclosure, a teller can control at least some of the operations of the article exchanging units with the operator computing device 28. Control commands/signals can be transmitted from the operator computing device 28 to the communications controller 26 and then from the communications controller 26 to the article exchanging unit being controlled. For example, with the operator computing device 28, a teller can control the VAT module 20 to activate (retrieving a carrier from the customer or directing the carrier to the customer), can control the terminal 22 to return currency to the customer, and/or cause the drawer 18 to open.

The exemplary communications controller 26 is configured to access remote communication components over the network 54 in response to predetermined operating conditions. For example, remote communication components are for use by remote operators and can take the form of a head set 56, a desktop phone 58, or a mobile phone 60. By way of example and not limitation, operating conditions indicating a need for remote operators can include a level of workflow at the bank branch 12 that overwhelms the operator(s) at the bank branch 12 or if a requested transaction requires specialized expertise. In an embodiment of the present disclosure operating at a pharmacy, a remote operator could be a health care provider.

The exemplary multi-lane communication system 24 can also be configured such that the exemplary communications controller 26 is operable to communicate directly with a smartphone of the customer instead of a camera, speaker, and microphone positioned at the relevant one of the transaction drawer 18, the pneumatic/vacuum module 20, or the terminal 22. The exemplary multi-lane communication system 24 can be configured to be retrofit to existing install base customer touch points. The components of the exemplary multi-lane communication system 24 can be configured for remote access for software updates and problem resolution. The exemplary multi-lane communication system 24 can be configured to go into a sleep mode to save display when no vehicle is detected or if send/call button not activated for some predetermined period of time.

In one or more embodiments of the present disclosure, the exemplary multi-lanc communication system 24 can facilitate the completion of pre-staged transactions. Generally, a pre-staged transaction is a transaction for which the customer provides details to a banking system before arriving at a physical location of the banking system at which the transaction is to be completed or consummated. One example of a pre-staged transaction would be defined by the customer arranging a cash withdrawal with his/her personal computer or smartphone communicating details of the transaction to a bank core and then arriving at an ATM and receiving the cash without again entering at least some of the transaction details. Another example of a pre-staged transaction would be a pharmaceutical prescription called into a pharmacy by a health care provider, for the patient to pick up at the pharmacy.

The exemplary communications controller 26 is in data communication with a server 62 over the network 54. The server 62 is a computing device and can be a bank core, part of a bank core, or a computing device in secure data communication with a bank core. The server 62 can store approved pre-staged transactions. A customer at the bank branch 12 can present a token to the operator that is indicative of one of the pre-staged transactions stored by the server 62. For example, a customer can present a quick response (QR) code to a camera or scanner positioned at one of the transaction drawer 18, the pneumatic/vacuum module 20, or the terminal 22. The operator can capture the QR code with the exemplary operator computing device 28 or, if the customer's QR code is scanned at the transaction drawer 18, the pneumatic/vacuum module 20, or the terminal 22, the data associated with the QR code can be communicated to the server 62 by the exemplary communications controller 26 for confirmation/approval. The exemplary communications controller 26 can communicate to the exemplary operator computing device 28 the response from the server 62. If the token is confirmed/approved, the operator can complete the pre-staged transaction.

In one or more embodiments of the present disclosure, a bank transaction can be processed by the system as follows. In response to a customer entering a drive-through lane, the sensor in that drive-through lane can emit a detection signal. The communications controller 26 can receive the detection signal and transmit an alert signal to the operator computing device 28 in response.

The display screen 38 of the operator computing device 28 can display the first field 40 containing a plurality of rows 42 wherein each row 42 of the plurality of rows 42 corresponds to one of the drive-through lanes. In response to receiving the alert signal, the operator computing device 28 can alter the appearance of the row that corresponds to the drive-through lane in which the customer has been received and/or the appearance of one or more buttons in the row. For example, the row can be changed from a non-highlighted appearance (a first configuration of the row), such as the rows above and below and the row 42 in FIG. 2, to a highlighted appearance (a second configuration of the row) such as row 42 as shown. In another example, a button, such button 44 can be changed from a non-highlighted appearance (a first configuration of the button), such as the buttons immediately above and below and the button 44 in FIG. 2, to a highlighted appearance (a second configuration of the button) such as button 44 as shown.

During execution of processing of the transaction, audio and visual data can be generated at the respective article exchanging unit that the customer is utilizing. For example, that article exchanging unit can include a camera and a microphone that generates video of the customer and audio of the customer. The article exchanging unit can transmit the audio and video data to the communications controller 26. The IP interface at the article exchanging unit can convert the data for communication to the communications controller 26 in accordance with the IP protocol. The communications controller 26 can then direct the audio and video data to the operator computing device 28, which can include the display screen 38 and a speaker.

Likewise, audio and visual data can be generated at the operator computing device 28. For example, the operator computing device 28 can include a camera and a microphone that generates video of the customer and audio of the teller. The operator computing device 28 can transmit the audio and video data to the communications controller 26, the data communicated in accordance with the IP protocol. The communications controller 26 can then direct the audio and video data to the article exchanging unit.

During execution of processing of the transaction, the teller can control the transmission of video and audio data from the operator computing device 28. The operator computing device 28 can include a camera and a microphone that generates video of the teller and audio of the teller. The operator computing device 28 can transmit the audio and video data to the communications controller 26 in accordance with the IP protocol. The communications controller 26 can then direct the audio and video data to the article exchanging unit, which can include a display screen and a speaker.

During the execution of processing a transaction with a VAT module, the teller can control the VAT module to send a carrier of the VAT module to the customer and/or bring the carrier back from the customer. For example, the teller can be presented with a control panel for the VAT module on the display screen of the tablet computer carried by the teller. The control panel can include buttons that the teller can press. Pressing a first button, for example, can result in the VAT module sending the carrier to the customer. All of the actions of the VAT module necessary to send the carrier can be initiated when the first button is pressed, such as the pressurizing of air, the generation of a vacuum, and/or the opening or closing of any doors. Pressing a second button, for example, can result in the VAT module bringing the carrier back into the bank branch from the customer. All of the actions of the VAT module necessary to bring the carrier back can be initiated when the second button is pressed, such as the pressurizing of air, the generation of a vacuum, and/or the opening or closing of any doors.

When the customer leaves the drive-through lane and/or the transaction is completed, the detection signal can cease and the communications controller 26 can cease to transmit the alert signal to the operator computing device 28. In response, the operator computing device 28 can alter the rows and/or buttons displayed on the display screen 38. For example, the row 42 and button 44 can be changed from a highlighted appearance to a non-highlighted appearance.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to a particular embodiment disclosed herein as the best mode contemplated for carrying out this present disclosure, but that the present disclosure will be viewed as covering any embodiment falling within the scope of the appended claims. Also, the right to claim a particular sub-feature, sub-component, or sub-element of any disclosed embodiment, singularly or in one or more sub-combinations with any other sub-feature(s), sub-component(s), or sub-element(s), is hereby unconditionally reserved by the Applicant. Also, particular sub-feature(s), sub-component(s), and sub-element(s) of one embodiment that is disclosed herein can replace particular sub-features, sub-components, and sub-elements in another embodiment disclosed herein or can supplement and be added to other embodiments unless otherwise indicated by the drawings or this specification. Further, the use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method of operating a system for processing bank transactions comprising:
    receiving a first customer in a first vehicle in a first drive-through lane of a plurality of drive-through lanes at a bank branch;
    positioning a plurality of article exchanging units, each having one or more processors, in the plurality of drive-through lanes including a first article exchanging unit of a plurality of article exchanging units positioned in the first drive-through lane, each of said plurality of article exchanging units configured to receive items from a bank customer and present items to the bank customer;
    generating, with the first article exchanging unit, at least one of first visual data and first audio data; and
    transmitting, with the first article exchanging unit, the at least one of first visual data and first audio data to a communications controller having one or more processors and positioned in the bank branch, said transmitting further defined as transmitting the at least one of first visual data and first audio data according to internet protocol.

2. The method of claim 1 further comprising:
    transmitting, with the communications controller, the at least one of first visual data and first audio data, according to the internet protocol, to a mobile operator computing device having one or more processors and positioned in the bank branch.

3. The method of claim 2 wherein said transmitting to the mobile operator computing device is further defined as:
    transmitting, with the communications controller, the at least one of first visual data and first audio data, according to the internet protocol, to a mobile operator computing device in the form of a tablet computer positioned in the bank branch.

4. The method of claim 2 wherein the at least one of first visual data and first audio data is further defined as first visual data and the method further comprises:
    displaying, on a display screen of the mobile operator computing device, the first visual data.

5. The method of claim 2 wherein the at least one of first visual data and first audio data is further defined as first audio data and the method further comprises:
    emitting, though a speaker of the mobile operator computing device, the first audio data.

6. The method of claim 1 further comprising:
    displaying, on a display screen of the mobile operator computing device, a first field containing a plurality of rows wherein each row of the plurality of rows corresponds to one of the plurality of drive-through lanes at the bank branch and wherein a plurality of buttons are also displayed in the plurality of rows.

7. The method of claim 6 further comprising:
    receiving, at the mobile operator computing device, a first input from a teller in response to the teller pressing a first button of the plurality of buttons, the first button displayed in a first row of the plurality of rows, the first row corresponding to the first drive-through lane of a plurality of drive-through lanes at the bank branch;
    transmitting, with the mobile operator computing device, in response to said receiving the first input, at least one of second visual data and second audio data, according to the internet protocol, to the communications controller; and transmitting, with the communications controller, the at least one of second visual data and second audio data, according to the internet protocol, to the first article exchanging unit.

8. The method of claim 7 further comprising:
receiving, at the mobile operator computing device, a second input from the teller in response to the first button selected by the teller after said receiving the first input; and
terminating, by the mobile operator computing device, said transmitting the at least one of second visual data and second audio data to the communications controller in response to said receiving the second input.

9. The method of claim 6 further comprising:
emitting, with one or more sensors positioned in the first drive-through lane, a detection signal in response to the first vehicle being in the first drive-through lane;
transmitting, with the communications controller, an alert signal to the mobile operator computing device in response to said emitting;
receiving, with the mobile operator computing device, the alert signal; and
altering, with the mobile operator computing device, a first button of the plurality of buttons displayed on the display screen, the first button in a first row of the plurality of rows, the first button altered from a first configuration of the first button to a second configuration of the first button in response to said receiving the alert signal.

10. The method of claim 9 further comprising:
ceasing, with the communications controller, said transmitting of the alert signal when said emitting ceases; and
altering, with the mobile operator computing device, the first button displayed on the display screen from the second configuration of the first button to the first configuration of the second button in response to said ceasing.

11. The method of claim 6 further comprising:
emitting, with one or more sensors positioned in the first drive-through lane, a detection signal in response to the first vehicle being in the first drive-through lane;
transmitting, with the communications controller, an alert signal to the mobile operator computing device in response to said emitting;
receiving, with the mobile operator computing device, the alert signal; and
altering, with the mobile operator computing device, a first row of the plurality of rows displayed on the display screen from a first configuration of the first row to a second configuration of the first row in response to said receiving the alert signal.

12. The method of claim 1 wherein said positioning is further defined as:
positioning the plurality of article exchanging units, each having one or more processors, in the plurality of drive-through lanes including the first article exchanging unit of a plurality of article exchanging units positioned in the first drive-through lane wherein the first article exchanging unit is a pneumatic vacuum module including a display screen.

13. A system for processing bank transactions comprising:
a plurality of drive-through lanes arranged at least partially side-by-side;
a plurality of article exchanging units, one of said plurality of article exchanging units positioned along each of said plurality of drive-through lanes, at least a first article exchanging unit of said plurality of article exchanging units differently configured from at least a second article exchanging unit of said plurality of article exchanging units, each of said plurality of article exchanging units configured to receive items from a bank customer within a vehicle and present items to the bank customer for retrieval, and each of said plurality of article exchanging units including at least one of a camera and a microphone configured to generate at least one of visual data and audio data;
a plurality of proximity sensors, one of said plurality of proximity sensors positioned in each of said plurality of drive-through lanes and configured to detect the vehicle within the respective drive-through lane of said plurality of drive-through lanes and emit a detection signal in response to detecting the vehicle;
at least one operator computing device having one or more processors and a display;
a communications controller having one or more processors and configured to:
receive the detection signal when emitted by any of said plurality of proximity sensors,
transmit an alert signal to said at least one operator computing device in response to receiving the detection signal wherein the alert signal indicates the presence of the vehicle and indicates a particular lane of said plurality of drive-through lanes in which the vehicle is detected, and
a plurality of internet protocol interfaces, one of said plurality of internet protocol interfaces engaged with each of said plurality of article exchanging units, each of said plurality of internet protocol interfaces configured to facilitate internet protocol communication between said plurality of article exchanging units and at least said communications controller.

14. The system of claim 13 wherein said plurality of article exchanging units includes:
a pneumatic vacuum module positioned in a first drive-through lane of said plurality of drive-through lanes;
an automated transaction machine positioned in a second drive-through lane of said plurality of drive-through lanes; and
a transaction drawer positioned in a third drive-through lane of said plurality of drive-through lanes.

15. The system of claim 13 wherein said at least one operator computing device is further defined as a tablet computer.

16. The system of claim 13 wherein said plurality of drive-through lanes are positioned adjacent to a bank branch and said at least one operator computing device is further defined as remote from the bank branch.

17. A system for processing bank transactions comprising:
a plurality of article exchanging units, at least a first article exchanging unit of said plurality of article exchanging units differently configured from at least a second article exchanging unit of said plurality of article exchanging units, each of said plurality of article exchanging units configured to receive items from a bank customer and present items to the bank customer, each of said plurality of article exchanging units including at least one of a camera and a microphone configured to generate at least one of visual data and audio data, said plurality of article exchanging units including at least a pneumatic vacuum module;
at least one operator computing device having one or more processors and a first display screen;

a communications controller configured to communicate according to the internet protocol with said at least one operator computing device and said plurality of article exchanging units, said communications controller configured to place said at least one operator computing device and said plurality of article exchanging units in communication with one another; and a plurality of internet protocol interfaces, one of said plurality of internet protocol interfaces engaged with each of said plurality of article exchanging units, each of said plurality of internet protocol interfaces configured to facilitate internet protocol communication between said plurality of article exchanging units and at least said communications controller.

18. The system of claim 17 wherein said pneumatic vacuum module includes a second display screen.

19. The system of claim 17 further comprising:
a plurality of sensors each configured to sense a vehicle and emit a detection signal to said communications controller in response to detecting the vehicle.

20. The system of claim 17 wherein said plurality of article exchanging units further includes at least a transaction drawer and an automated transaction machine.

* * * * *